United States Patent [19]
Saitoh et al.

[11] Patent Number: 5,568,580
[45] Date of Patent: Oct. 22, 1996

[54] OPTICAL STAR-COUPLER

[75] Inventors: Tetsuya Saitoh; Hideo Shimizu, both of Tokyo, Japan

[73] Assignee: Fuji Electric Co., Ltd., Tokyo, Japan

[21] Appl. No.: 478,961

[22] Filed: Jun. 7, 1995

Related U.S. Application Data

[62] Division of Ser. No. 276,708, Jul. 18, 1994.

[30] Foreign Application Priority Data

Jul. 19, 1993 [JP] Japan ............................ 5-118074

[51] Int. Cl.⁶ .................................................. G02B 6/26
[52] U.S. Cl. .................... 385/46; 385/33; 385/47; 385/901
[58] Field of Search ............................ 385/37, 33, 34, 385/35, 36, 31, 46, 47, 901

[56] References Cited

U.S. PATENT DOCUMENTS

| | | | |
|---|---|---|---|
| 3,941,485 | 3/1976 | Madden | 385/901 |
| 4,179,185 | 12/1979 | Hawk | 385/46 |
| 5,442,467 | 8/1995 | Silverstein et al. | 385/901 |

FOREIGN PATENT DOCUMENTS

| | | |
|---|---|---|
| 0299159 | 1/1989 | European Pat. Off. . |
| 2456619 | 8/1976 | Germany . |
| 3723170 | 2/1989 | Germany . |
| 6-138341 | 5/1994 | Japan ............................ 385/33 |

OTHER PUBLICATIONS

Oikawa et al; "Optical Tap Array Using Distributed–Index Plannar Microlens"; Electronic Letters (Apr. 1982), vol. 18, No. 8; pp. 316–317.

60–73603 Patent Abstracts of Japan, P–384 Aug. 31, 1985, vol. 9/No. 214.

*Primary Examiner*—John Ngo
*Attorney, Agent, or Firm*—Brumbaugh, Graves, Donohue & Raymond

[57] ABSTRACT

A light beam from an optical fiber held by waveguide support is guided to an illuminated region of a light-receiving section. A light beam from one light-deflecting device inside this region is reflected by a reflecting surface and passed as a light beam through a second light-deflecting device in another illuminated region to arrive at a second optical fiber. A light beam from the second optical fiber takes the reverse route to the foregoing route. In this way, various light-deflecting devices in one illuminated region are optically coupled to light-deflecting devices in other illuminated regions with substantially equal optical coupling intensity.

14 Claims, 5 Drawing Sheets

OPTICAL STAR-COUPLER

This application is a division of application Ser. No. 08/276,708, filed on Jul. 18, 1994.

BACKGROUND OF THE INVENTION

The present invention relates to an optical star-coupler for distributing and coupling light signals transmitted by waveguides such as optical fibers.

In order to build a communication network, using optical fibers or the like, optical star-couplers for distributing a light signal among plural optical fibers and coupling light signals from plural optical fibers into one optical fiber are necessary. A known optical star-coupler achieving this object is shown in FIG. 11.

This is fabricated by binding together plural optical fibers 101–105, melting the bundle at a high temperature to form a welded portion 110, and mounting a reflector 120 at the front end of the welded portion 110. As an example, a light beam going out of the optical fiber 103 passes through the welded portion 110, is reflected by the reflector 120, again passes through the welded portion 110, and is distributed to other optical fibers.

Generally, a light beam emerging from an optical fiber has an intensity distribution such that the intensity is high around the center of the beam, while decreasing toward the peripheral region of the beam. Therefore, in the optical star-coupler shown in FIG. 11, different areas of a light beam which emerges from a single optical fiber get distributed to other optical fibers, and so the light signals cannot be distributed uniformly. A light beam emerging from an optical fiber is propagated so as to become diffused. In the optical star-coupler constructed as shown in FIG. 11, the outgoing light beam is simply reflected by a reflector. Therefore, a large portion of the light beam does not reach other optical fibers and hence a large loss takes place.

SUMMARY OF THE INVENTION

The problem to be solved by the present invention is the ability to substantially distribute light signals in a uniform manner, or to reduce loss.

In order to solve this problem, the present invention provides an optical star-coupler for coupling N incident light beams transmitted by N waveguides, where N is an integer greater than or equal to 3 and each of the N waveguides has an end surface for emitting an incident light beam. The optical star-coupler includes means for supporting the end surfaces of the N waveguides; light-receiving means for receiving the N incident light beams to thereby form N illuminated regions on the light-receiving means, where the light-receiving means includes, at each of the illuminated regions, N–1 means for deflecting the incident light beams into N–1 output light beams; and means for reflecting the output light beams. Each of the deflecting means is optically coupled by the reflecting means to deflecting means at a different illuminated regions. Preferably, the optical coupling between the pairs of deflecting means is substantially equal.

In one embodiment, the deflecting means are transmission type diffraction gratings, and the light-receiving means is positioned between the supporting means and the reflecting means. The deflecting means may focus the output light beams onto the reflecting means, or alternatively, emit the output light beams as parallel beams.

In a second embodiment, the deflecting means are reflectors such as mirrors or reflection type diffraction gratings, the supporting means has an inside face which faces the light-receiving means, and the reflecting means forms part of the inside face of the supporting means. As with the first embodiment, the deflecting means may focus the output light beams onto the reflecting means, or alternatively, emit the output light beams as parallel beams.

In the above-described arrangements, the waveguides connected to the waveguide support portion are preferably arranged so that the end surfaces of the waveguides are arranged in a rotationally symmetrical relation about a point on the waveguide support, with the several adjacent waveguides being regularly spaced from each other. Regions of illumination which correspond to the waveguides can be formed on the light-receiving section in such a way that the illuminated regions are also arranged in a rotationally symmetrical relation about a point on the light-receiving portion, with the several illuminated regions being regularly spaced from each other. Consequently, the apparatus is easy to design and fabricate. In each of the above described arrangements, the light-receiving section can be fabricated to have overlapping illuminated regions in which the deflecting means are mounted. In this way, the whole light-receiving portion can contain less than N·(N–1) deflecting means, which enables miniaturization.

Every deflecting means in an illuminated region is always optically coupled to at least one deflecting means in a remaining illuminated region. Furthermore, the intensity of the optical coupling between them is preferably made substantially equal. Hence, light signals can be uniformly distributed. Each deflecting means within the light-receiving section is optically designed so that when an incident light beam is divided into a plurality of output beams, that are deflected the outgoing beams are brought beam into focus on a desired reflecting surface, or are collimated. As a result, the loss of the optical energy is reduced.

DESCRIPTION OF THE PREFERRED EMBODIMENTS

Figure 1:
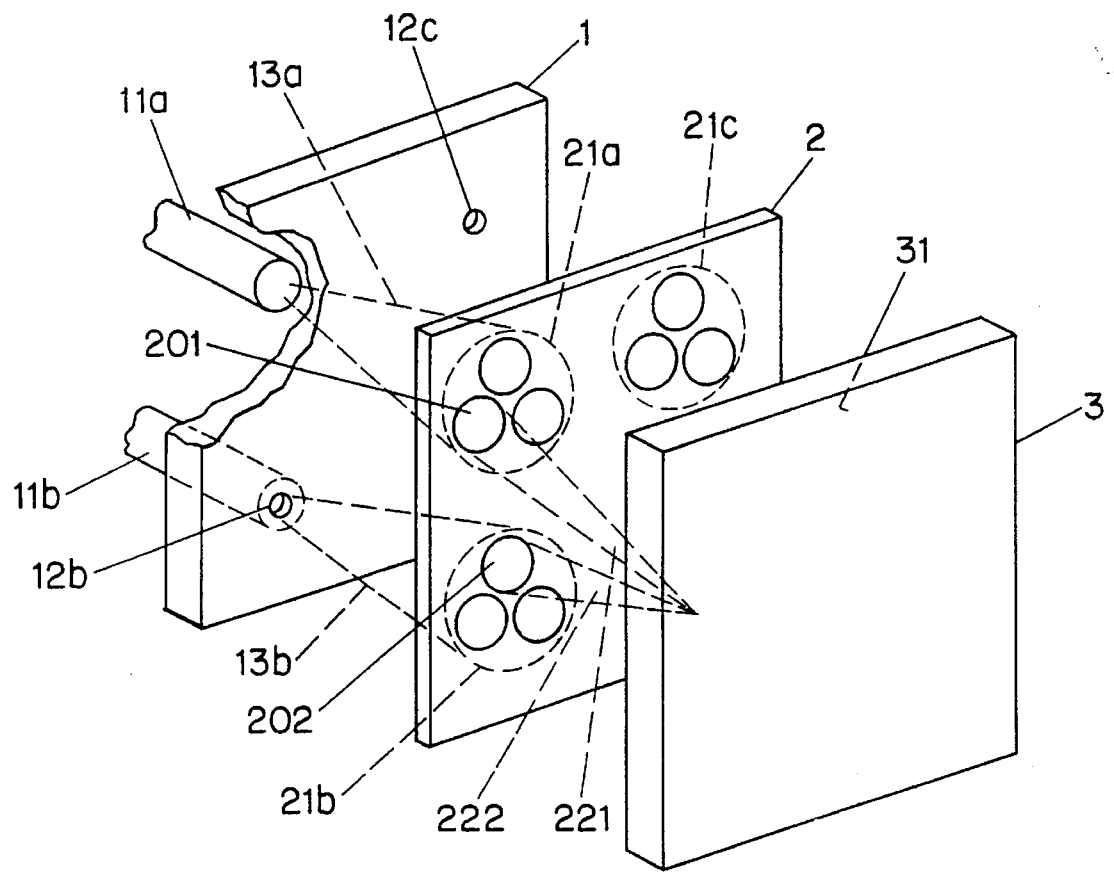
FIG. 1 is a schematic showing an example of the first embodiment of the invention.
Figure 2:
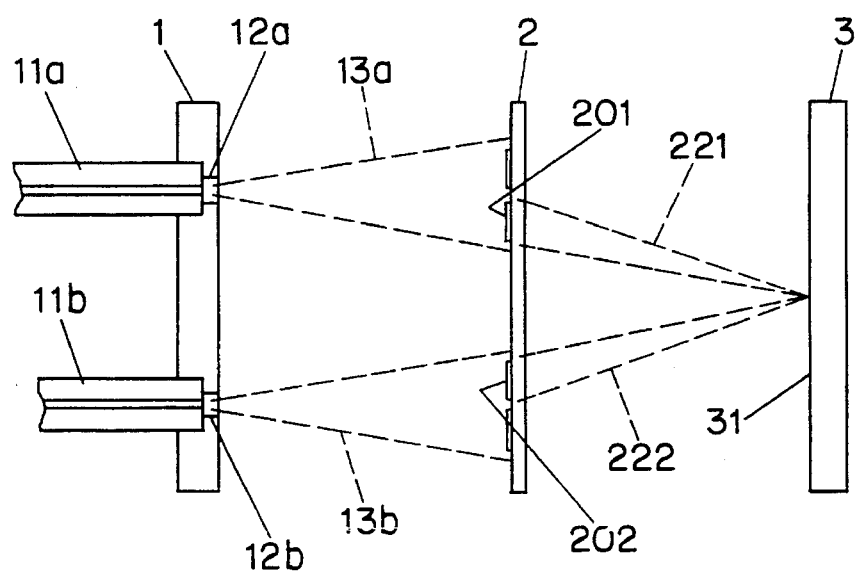
FIG. 2 is a view illustrating the operation of FIG. 1.

FIG. 1 is a schematic illustrating an example of the first embodiment of the present invention. FIG. 2 is a view illustrating the operation of FIG. 1.

In FIG. 1, there is shown waveguide support 1, light-deflecting section 2, and plane mirror 3. The waveguide support 1 is provided with openings 12a, 12b, 12c, and 12d (neither 12a nor 12d is shown). Optical fibers 11a, 11b, 11c, and 11d (neither 11c nor 11d is shown) are held in mounting holes formed in waveguide support 1. Thus, the end surfaces from which light beams in the optical fibers emerge are connected with the mounting holes. Light beams 13a, 13b, 13c, and 13d (neither 13c nor 13d is shown) emitted by optical fibers 11a, 11b, 11c, and 11d, respectively, pass through mounting holes 12a, 12b, 12c, and 12d, respectively, and impinge on illuminated regions 21a, 21b, 21c, and 21d (21d is not shown) of light-reflecting section 2.

Three light-deflecting devices, each consisting of a transmission type diffraction grating are formed in each of the illuminated regions 21a, 21b, 21c, and 21d. For example, if light beam 13a from optical fiber 11a enters the illuminated region 21a, then light-deflecting device 201 existing in the illuminated region 21a deflects part of the beam by diffraction, causing the beam to emerge from the device in such a way that the deflected beam is brought into focus on the reflecting surface 31 of plane mirror 3. At this time, outgoing light beam 221 is reflected by reflecting surface 31 to impinge as light beam 222 on light-deflecting device 202 existing within the illuminated region 21b.

When light beam 13b from optical fiber 11b enters the illuminated region 21b, light-deflecting device 202 deflects part of the beam by diffraction and causes the beam to emerge from the device so that the deflected beam is brought into focus on reflecting surface 31 of plane mirror 3. At this time, outgoing light beam 222 is reflected by reflecting surface 31 to impinge as light beam 221 on light-deflecting device 201 existing within the illuminated region 21a.

Therefore, as shown in FIG. 2, part of light beam 13a emitted from optical fiber 11a is deflected by light-deflecting device 201, reflecting surface 31, and light-deflecting device 202 in succession, to thereby propagate in a direction opposite to the direction in which light beam 13b travels, and enter optical fiber 11b. Similarly, part of light beam 13b emitted from optical fiber 11b is deflected by light-deflecting device 202, reflecting surface 31, and light-deflecting device 201 in succession, to thereby propagate in a direction opposite to the direction in which light beam 13a travels and enter optical fiber 11a. Thus, it can be seen that the light signal from optical fiber 11a can be passed to optical fiber 11b and that the light signal from optical fiber 11b can be passed to optical fiber 11a.

The other two light-deflecting devices existing within illuminated region 21a (excluding light-deflecting device 201) couple with the light-deflecting devices located inside illuminated regions 21c and 21d, and act similarly to the above-described light-deflecting devices 201 and 202. Therefore, light signals can be transmitted between optical fibers 11a and 11c and between optical fibers 11a and 11d.

The description made thus far centers on the light-deflecting devices existing inside the illuminated region 21a. The light-deflecting devices within the other illuminated regions can perform similarly. Consequently, if a light signal is emitted from any optical fiber connected with waveguide support 1, it can be transmitted to all the other optical fibers connected to support 1.

Figure 3:
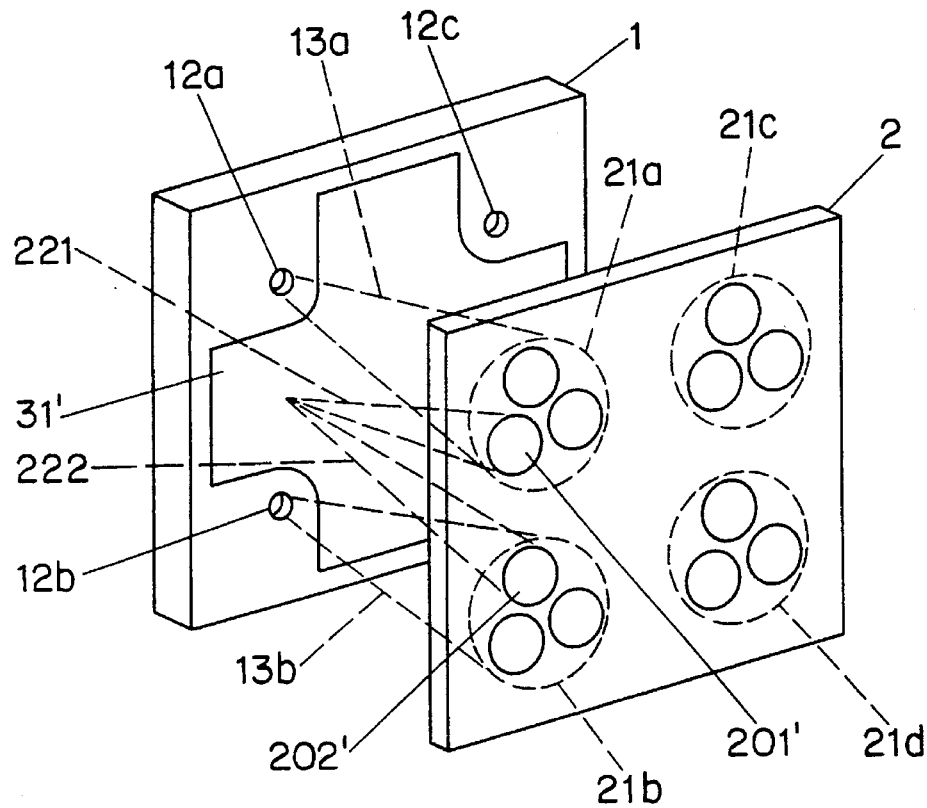
FIG. 3 is a schematic of an example of the second embodiment invention.
Figure 4:
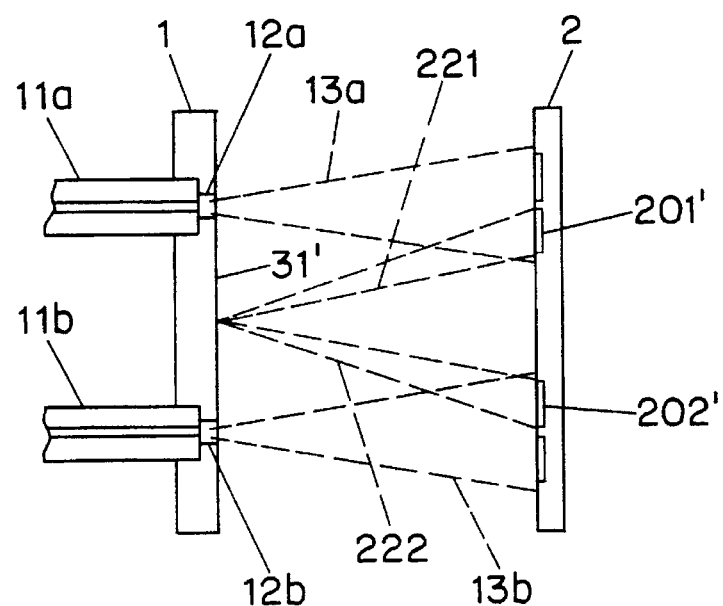
FIG. 4 is a view illustrating the operation of FIG. 3.

In FIGS. 1 and 2, the light-deflecting devices are transmission type diffraction gratings. However, according to the second embodiment of the present invention the devices can also be of the reflection type. FIG. 3 is a schematic illustrating an example of such an arrangement, and FIG. 4 is a view illustrating the operation of the arrangement shown in FIG. 3.

Optical fibers 11a, 11b, 11c, 11d (for 11a and 11b, refer to FIG. 4; 11c and 11d are not shown) connected to a waveguide support 1 emit light beams 13a, 13b, 13c, and 13d (only 13a and 13b are shown) and illuminate regions 21a, 21b, 21c, and 21d. Three light-deflecting devices (only 201' and 202' are shown), each consisting of a reflection type diffraction grating are mounted in each of the illuminated regions 21a–21d.

For example, if light beam 13a from optical fiber 11a enters the illuminated region 21a, then light-deflecting device 201', existing within the illuminated region 21a, deflects part of the incident beam by diffraction and causes the beam to emerge from the device so that the beam is focused onto reflecting surface 31', of waveguide support 1, opposite to light-deflecting section 2. At this time, outgoing light beam 221 is reflected by reflecting surface 31' to impinge as light beam 222 on light-deflecting device 202' which exists inside the illuminated region 21b.

If light beam 13b from optical fiber 11b enters the illuminated region 21b, then light-deflecting device 202' deflects part of the beam by diffraction and causes the beam to emerge from the device so that the beam is focused onto reflecting surface 31'. At this time, output light beam 222 is reflected by reflecting surface 31' to impinge as light beam 221 on light-deflecting device 201' which exists inside the illuminated region 21a.

Therefore, as shown in FIG. 4, part of light beam 13a emitted by optical fiber 11a is deflected by light-deflecting device 201', reflecting surface 31', and light-deflecting device 202' in succession. Thereafter, the deflected beam propagates in a direction opposite to the direction of propagation of the light beam 13b emitted by optical fiber 11b and enters optical fiber 11b. Similarly, part of light beam 13b emerging from optical fiber 11b is deflected by light-deflecting device 202', light-reflecting surface 31', and light-deflecting device 201' in succession. This deflected beam then propagates in a direction opposite to the direction of propagation of light beam 13a emitted from optical fiber 11a to enter optical fiber 11a. Consequently, the light signal from optical fiber 11a can be transmitted to optical fiber 11b. Also, the light signal from optical fiber 11b can be transmitted to optical fiber 11a.

In the case of FIGS. 3 and 4, the foregoing focuses on the relation between the light-deflecting devices 201' and 202'. The same relation exists between other light-deflecting devices 203' and 204' (not shown). Accordingly, if a light signal is radiated from any optical fiber connected with waveguide support 1, then the signal can be transmitted to all the other optical fibers which are connected to support 1. In the embodiment of FIGS. 3 and 4, a mirror can be used as each light-deflecting device instead of a reflection type diffraction grating.

Figure 5:
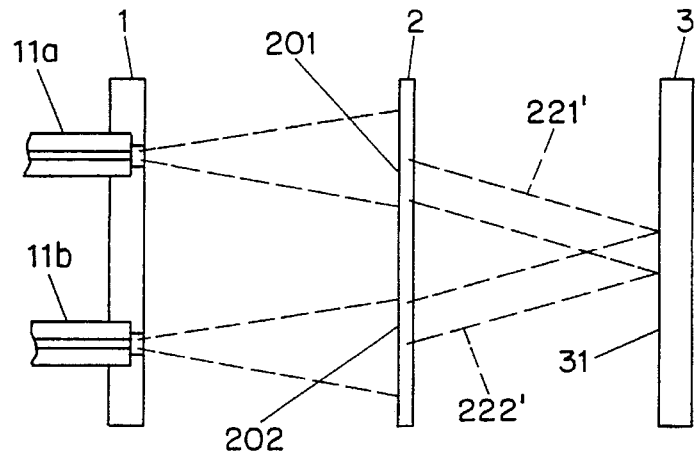
FIG. 5 is a schematic showing a modification of FIG. 1.
Figure 6:
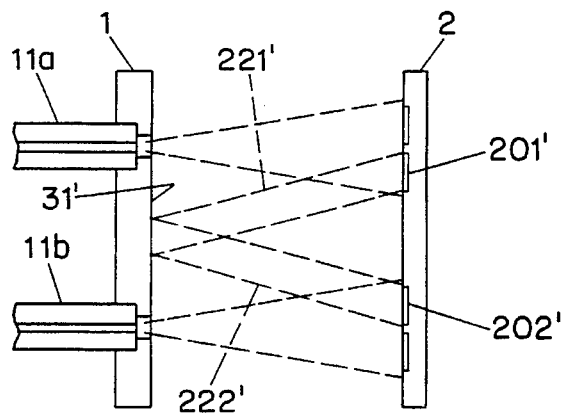
FIG. 6 is a schematic showing a modification of FIG. 3.

FIG. 5 is a schematic of a modification of the arrangement shown in FIGS. 1 and 2. FIG. 6 is a schematic of a modification of the arrangement shown in FIGS. 3 and 4.

Specifically, in FIGS. 1 and 2, a light beam transmitted between a light-deflecting device and the reflecting surface of the plane mirror is deflected by the light-deflecting device so that the beam is brought into focus on the reflecting surface. Alternatively, as shown in FIG. 5, the light beam is deflected by a light-deflecting device so that the light beam transmitted between the light-deflecting device and a plane mirror is a parallel beam. For example, the light beam transmitted between light-deflecting device 202 and reflecting surface 31 is a parallel beam 222'. Similarly, the arrangement shown in FIGS. 3 and 4 may be designed as shown in FIG. 6.

In the arrangements of FIGS. 1–6 described above, each light-deflecting device has a circular light-deflecting region of the same size. In each illuminated region containing three light-deflecting devices, each light-deflecting device is disposed in a rotationally symmetrical relation with the other light-deflecting devices in the same illuminated region with respect to the center of that illuminated region. The distance between the center of the illuminated region and each light-deflecting device is the same within every illuminated region. Since the spatial intensity distribution of the light beam emitted from each optical fiber shows a rotational symmetry, if the intensities of the light beams emitted by the optical fibers are the same during illumination of the light-deflecting devices, then the intensities of the light beams incident on the light-deflecting devices are the same.

Furthermore, every light-deflecting device is formed in a plane parallel to the reflecting surface of the plane mirror. Consequently, the distance from each light-deflecting device to the reflecting surface is the same. Therefore, a light beam incident on a given illuminated region can be branched into three output light beams having the same intensity by the three light-deflecting devices which reside within the illuminated region, which are then deflected. In addition, these output light beams are caused to enter a second set of light-deflecting devices which pair with the light-deflecting devices of the given illuminated region with the same coupling efficiency. Then, the beams are deflected by the second set of light-deflecting devices, and enter the optical fibers which can illuminate their respective light-deflecting devices. In consequence, the intensities of the light beams can be made substantially uniform.

Figure 7:
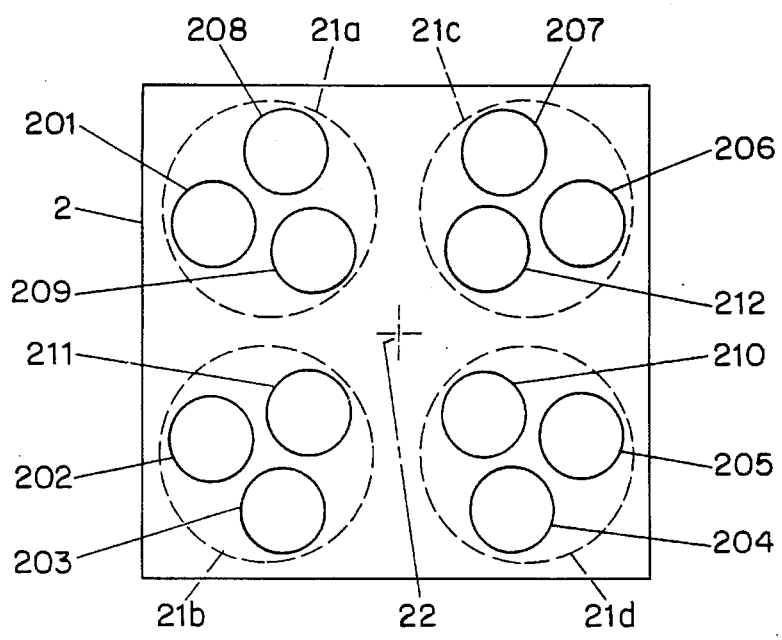
FIG. 7 is a schematic view of a specific example of a light-receiving section.

FIG. 7 is a schematic of a specific example of the light-deflecting section.

In this example, the illuminated regions 21a–21d exhibit a rotationally symmetrical relation with respect to the central axis 22 perpendicular to the plane of the sheet of this figure. The regions are so disposed that the distances between the adjacent illuminated regions are equal. Moreover, light-deflecting devices 201–215 are each disposed in a rotationally symmetrical relation with respect to the central axis 22 in each illuminated region.

Optical fibers emit light beams which impinge on the illuminated regions. Light signals are coupled between these optical fibers by the light-deflecting devices. Of these devices, 201 and 202 make a pair. Devices 203 and 204 make a pair. Devices 205 and 206 make a pair. Devices 207 and 208 make a pair. Devices 209 and 210 make a pair. Devices 211 and 212 make a pair. In this light-deflecting section 2, three light-deflecting devices of the same shape are arranged in a rotation symmetry with respect to the central axis 22 in each illuminated region. Consequently, the intensities of the light beams can be made substantially uniform.

Figure 8:
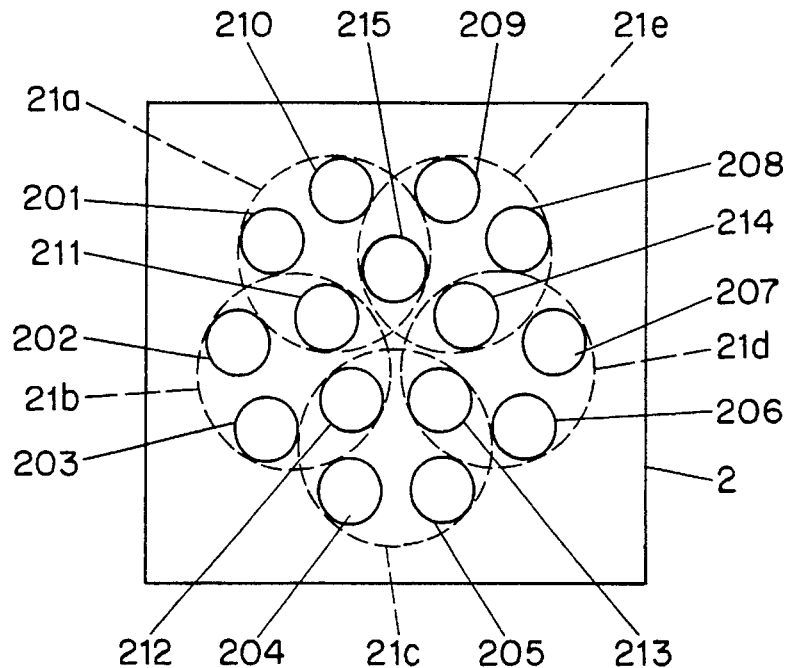
FIG. 8 is a schematic view of a second specific example of a light-receiving section.

FIG. 8 shows another specific example of the light-deflecting section. Five optical fibers emit light beams which illuminate five regions, respectively. In each illuminated region, four light-deflecting devices are mounted.

The illuminated region 21a contains light-deflecting devices 201, 210, 211, and 215. The illuminated region 21b contains light-deflecting devices 202, 203, 211, and 212. The illuminated region 21c contains light-deflecting devices 204, 205, 212, and 213. The illuminated region 21d contains light-deflecting devices 206, 207, 213, and 214. The illuminated region 21e contains light-deflecting devices 208, 209, 214, and 215.

In this arrangement, if illuminated region 21a is illuminated with a light beam emitted by optical fiber 11a (not shown), then light-deflecting device 211 will deflect part of the light beam to produce an outgoing beam. The outgoing beam is then reflected by the reflecting surface of a plane mirror (not shown) to enter light-deflecting device 212 where it is deflected again, and enters optical fiber 11c (not shown) which is connected so as to illuminate illuminated region 21c.

Similarly, if illuminated region 21b is illuminated with a light beam emitted by optical fiber 11b (not shown), then light-deflecting device 211 will deflect part of the light beam to produce an outgoing beam. The outgoing beam is then reflected by the reflecting surface of the plane mirror (not shown) to enter light-deflecting device 215 where it is deflected again, and enters optical fiber 11e (not shown) which is connected so as to illuminate illuminated region 21e.

Light-deflecting device 211 has deflecting characteristics which permit this optical system. That is, light-deflecting device 211 acts to transmit light signals through two paths which extend between optical fibers 11a and 11c and between optical fibers 11b and 11e, respectively. Similarly, light-deflecting devices 212, 213, 214, and 215 serve to transmit light signals through two paths between optical fibers 11b and 11d and between optical fibers 11a and 11c, respectively, through two paths between optical fibers 11c and 11e and between the optical fibers 11b and 11d, respectively, through two paths between optical fibers 11d and 11a and between optical fibers 11c and 11e, respectively, and through two paths between optical fibers 11e and 11b and between optical fibers 11d and 11a, respectively.

In this way, the illuminated regions overlap each other. Due to this fact and because the light-deflecting devices are contained in the overlapping regions, the size of the light-deflecting section can be made smaller.

Figure 9:
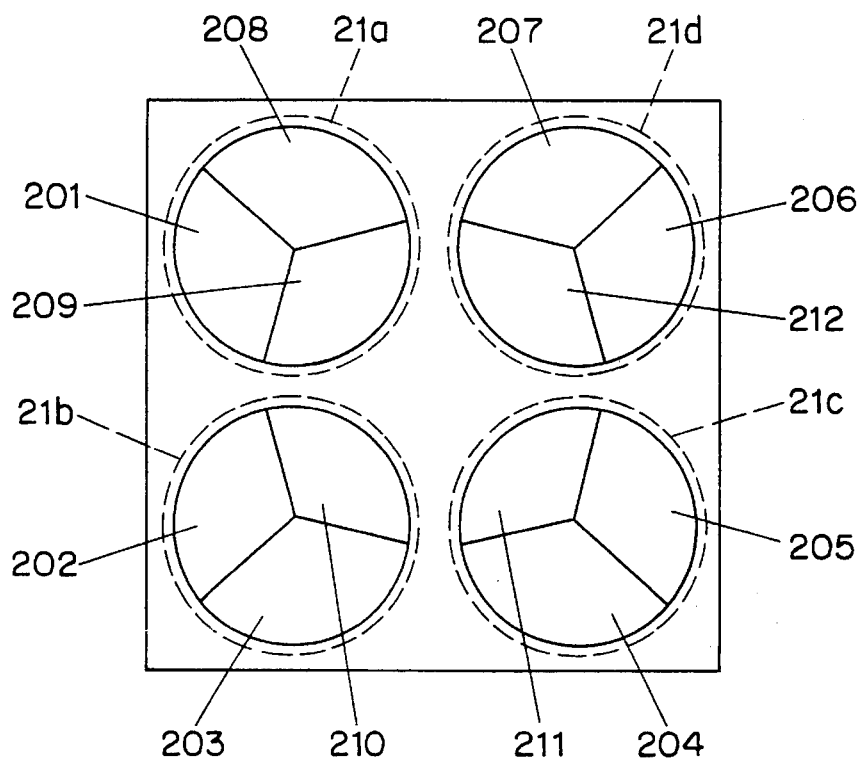
FIG. 9 is a schematic view of a modified example of the deflecting means.

In the description made thus far, the light-deflecting region of the light-deflecting devices are circular and have the same size. However, the light-deflecting regions can be shaped into sectors as shown in FIG. 9, or take other forms.

Figure 10:
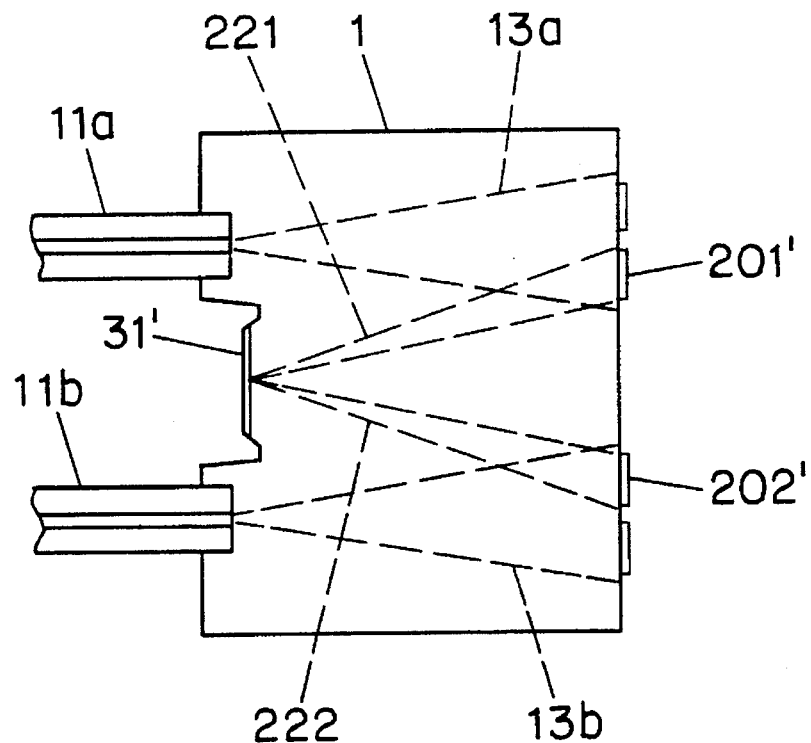
FIG. 10 is a schematic view of an integrally fabricated structure.
Figure 11:
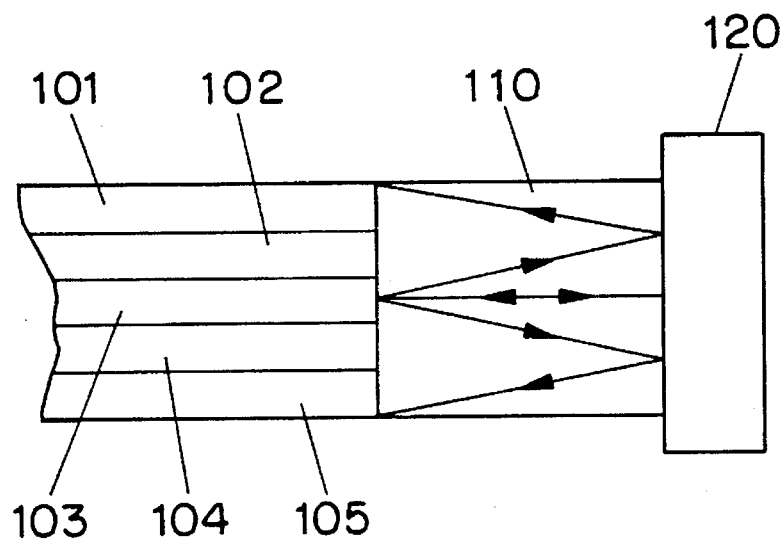
FIG. 11 is a schematic view of a prior art structure.

In the arrangements described above, the waveguide support, the light-receiving section and the plane mirror require at least two separate components. However, as shown in FIG. 10, the waveguide support, the light-receiving section, and the plane mirror can be integrally fabricated out of an optically transparent material. The light-deflecting devices and the reflecting surface can be formed on the surface.

It can be expected that the present invention produces the following effects:

(1) Every light-deflecting device in an illuminated region is always optically coupled to at least one other light-deflecting device in the remaining illuminated regions. Furthermore, the optical coupling intensities between them are made substantially equal. Hence, light signals can be uniformly distributed.

(2) Each light-deflecting device of the light-receiving portion is optically designed so that when an incident light beam is branched and deflected into plural output beams, the device brings a part of each output beam into focus on a desired reflecting surface, or alternatively, collimates the beam. As a result, the loss of the optical energy can be reduced.

(3) The end surfaces of the waveguides connected to the waveguide support are arranged in a rotationally symmetrical relation so that the adjacent waveguides are regularly spaced from each other. In the light-receiving section, the illuminated regions corresponding to the waveguides are arranged in a rotational symmetrical relation so that the adjacent regions are equally spaced from each other. Consequently, the apparatus is easy to design and fabricate.

(4) The light-receiving section can be fabricated to have overlapping illuminated regions. Light-deflecting devices are mounted in the illuminated regions. The whole light-receiving section can thus contain less than N·(N−1) light-deflecting devices where N is an integer equal to the number of waveguides connected to the waveguide support. This permits miniaturization of the light-receiving section.

We claim:

1. An optical star-coupler for coupling N incident light beams transmitted by N waveguides for N>2, each of said N waveguides having an end surface for emitting an incident light beam, comprising:
   (a) means for supporting said end surfaces of said N waveguides;
   (b) light-deflecting means for receiving said N incident light beams to thereby form N illuminated regions on said light-deflecting means, said light-deflecting means including, at each of said illuminated regions, N−1 reflectors for splitting and deflecting said incident light beams into N−1 output light beams; and
   (c) means for reflecting said output light beams;
   wherein each reflector at each of said illuminated regions is optically coupled by said reflecting means to at least one reflector at a different one of said illuminated regions;
   said supporting means having an inside face facing said light-deflecting means, wherein said reflecting means forms part of said inside face of said supporting means.

2. The optical star-coupler according to claim 1, wherein said reflectors are reflection type diffraction gratings.

3. The optical star-coupler according to claim 1, wherein said reflectors are mirrors.

4. The optical star-coupler according to claim 1, wherein said deflecting means focus said output light beams onto said reflecting means.

5. The optical star-coupler according to claim 1, wherein said deflecting means emit said output light beams as parallel beams.

6. The optical star-coupler according to claim 1, wherein said supporting means and said light-receiving means are integrally fabricated from optically transparent material.

7. An optical star-coupler for coupling N incident light beams transmitted by N waveguides for N>2, each of said N waveguides having an end surface for emitting an incident light beam, comprising:
   (a) means for supporting said end surfaces of said N waveguides;
   (b) light-deflecting means for receiving said N incident light beams to thereby form N illuminated regions on said light-deflecting means, said light-deflecting means including, at each of said illuminated regions, N−1 reflectors for splitting and deflecting said incident light beams into N−1 output light beams; and
   (c) means for reflecting said output light beams;
   wherein each reflector at each of said illuminated regions is optically coupled by said reflecting means to at least one reflector at a different one of said illuminated regions;
   wherein said end surfaces of said N waveguides are arranged in a rotationally symmetrical relation about a point on said waveguide support and said N illuminated regions on said light-deflecting means are arranged in a rotationally symmetrical relation about a point on said light-deflecting means.

8. The optical star-coupler according to claim 7, wherein for each illuminated region, said N−1 deflecting means are arranged in a rotationally symmetrical relation about a central point of said illuminated region.

9. The optical star-coupler according to claim 8, wherein said deflecting means include circular light-deflecting regions.

10. The optical star-coupler according to claim 8, wherein said deflecting means include sector-shaped light-deflecting regions.

11. The optical star-coupler according to claim 8, wherein N=4.

12. The optical star-coupler according to claim 8, wherein at least one of said deflecting means associated with any illuminated region is also associated with a different illuminated region, so that the light-receiving means includes less than N·(N−1) deflecting means.

13. The optical star-coupler according to claim 12, wherein N=5 and two of said deflecting means associated with any illuminated region are also associated with different illuminated regions, so that the light-receiving means includes fifteen deflecting means.

14. An optical star-coupler for coupling N incident light beams transmitted by N waveguides for N>2, each of said N waveguides having an end surface for emitting an incident light beam, comprising:
   (a) means for supporting said end surfaces of said N waveguides;
   (b) light-deflecting means for receiving said N incident light beams to thereby form N illuminated regions on said light-deflecting means, said light-deflecting means including, at each of said illuminated regions, N−1 reflectors for splitting and deflecting said incident light beams into N−1 output light beams; and
   (c) a plane mirror for reflecting said output light beams;
   wherein each reflector at each of said illuminated regions is optically coupled by said plane mirror to at least one reflector at a different one of said illuminated regions.

* * * * *